US008681605B2

(12) United States Patent
Balus et al.

(10) Patent No.: US 8,681,605 B2
(45) Date of Patent: Mar. 25, 2014

(54) METHOD AND APPARATUS FOR USING G.8031 EXTENSIONS TO ENABLE COEXISTENCE OF G.8031-BASED PROTECTION AND LAG-LIKE LOADSHARING FOR ETHERNET PATHS

(75) Inventors: Florin Balus, Cupertino, CA (US); Andrew Dolganow, Ottawa (CA); Kajal Saha, Kanata (CA); Georges Chung Kam Chung, Nepean (CA)

(73) Assignee: Alcatel Lucent, Paris (FR)

( * ) Notice: Subject to any disclaimer, the term of this patent is extended or adjusted under 35 U.S.C. 154(b) by 209 days.

(21) Appl. No.: 12/987,572

(22) Filed: Jan. 10, 2011

(65) Prior Publication Data
US 2012/0176890 A1    Jul. 12, 2012

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl.
USPC ............ 370/219; 370/223; 370/227; 370/244

(58) Field of Classification Search
USPC ......... 370/218, 217, 219, 223, 225, 227, 236, 370/242, 244, 245, 248, 250, 400, 401
See application file for complete search history.

(56) References Cited

U.S. PATENT DOCUMENTS

| | | | | |
|---|---|---|---|---|
| 2008/0228943 | A1* | 9/2008 | Balus et al. | 709/239 |
| 2010/0172238 | A1* | 7/2010 | Saltsidis et al. | 370/228 |
| 2012/0033547 | A1* | 2/2012 | Joshi et al. | 370/225 |
| 2012/0033549 | A1* | 2/2012 | Joshi et al. | 370/228 |
| 2012/0063312 | A1* | 3/2012 | Sarwar et al. | 370/235 |
| 2012/0176890 | A1* | 7/2012 | Balus et al. | 370/218 |

OTHER PUBLICATIONS

"ITU-T G.8031/Y.1342 Ethernet linear protection switching Series G: Transmission Systems and Media, Digital Systems and Networks, Series Y: Global Information Infrastructure, Internet Protocol Aspects and Next-Generation Networks", available Nov. 2009.*
IEEE Standard for Local and Metropolitan Area Networks—Virtual Bridged Local Area Networks Amendment 7: Provider Backbone Bridges; IEEE Std 802.1ah-2008; Aug. 14, 2008.
IEEE Standard for Local and Metropolitan Area Networks—Media Access Control (MAC) Bridges; IEEE Std 802.1D; Jun. 9, 2004.

(Continued)

Primary Examiner — Benjamin H Elliott, IV
(74) Attorney, Agent, or Firm — Wall & Tong, LLP

(57) ABSTRACT

An Ethernet protection and loadsharing capability is provided. The Ethernet protection and loadsharing capability enables co-existence of both protection and loadsharing for an Ethernet tunnel, having a plurality of associated Ethernet paths, between first and second Ethernet switches. The first Ethernet switch receives configuration information associated with the Ethernet tunnel between the first and second Ethernet switches, and processes the configuration information for causing the first Ethernet switch to associate the Ethernet paths of the Ethernet tunnel with an Ethernet tunnel endpoint object associated with an Ethernet tunnel. The first Ethernet switch, upon receiving traffic intended for the second Ethernet switch, propagates the traffic from the first Ethernet switch toward the second Ethernet switch via at least a subset of the Ethernet paths of the Ethernet tunnel using protection and/or loadsharing.

20 Claims, 9 Drawing Sheets

(56) References Cited

OTHER PUBLICATIONS

ITU-T, G.8031/Y.1342 (Jun. 2006), Series G: Transmission Systems and Media, Digital Systems and Networks, Ethernet over Transport aspects—General aspects, Series Y: Global Information Infrastructure, Internet Protocol Aspects and Next-Generation Networks, Internet Protocol Aspects—Transport, Jun. 2006.

ITU, Telecommunication standardization Sector, Study Group 15, TD 380 Rev1 (PLEN/15), Draft new Amendment 1 to Recommendation G.8031/Y.1342 (for consent), Geneva, Jun. 4-15, 2007.

\* cited by examiner

METHOD AND APPARATUS FOR USING G.8031 EXTENSIONS TO ENABLE COEXISTENCE OF G.8031-BASED PROTECTION AND LAG-LIKE LOADSHARING FOR ETHERNET PATHS

FIELD OF THE INVENTION

The invention relates generally to communication networks and, more specifically but not exclusively, to providing protection and loadsharing for Ethernet paths.

BACKGROUND

The Metro Ethernet Forum (MEF) has specified two Ethernet services that may be used to replace traditional static permanent virtual circuits with Ethernet virtual circuits (EVCs). These two Ethernet services are Carrier Ethernet Private/Virtual Line Service (denoted as ELINE) and Carrier Ethernet Multipoint-to-Multipoint LAN Service (denoted as ELAN), both of which may be offered as private or virtual services where private services are transported via dedicated lines and connections at fixed and predefined wire speeds and virtual services are multiplexed statistically and transported over shared lines and connections.

In general, the ELINE service is a point-to-point service that is transparent to layer-2 protocols and supports scalability and bandwidth management. The ELINE service also supports class-of-service (CoS), VLAN tagging, and other features. For example, two ELINE connectivity services include: (1) Ethernet Private Line (EPL), which is port-based and has dedicated bandwidth; and (2) Ethernet Virtual Private Line (EVPL), which is VLAN-based and has shared bandwidth.

In general, the ELAN service is a multipoint-to-multipoint service that allows hosts to be connected and disconnected dynamically, where each ELAN host is given its own bandwidth profile, which specifies its CoS. For example, two ELAN connectivity services include: (1) Ethernet Private LAN (EPLAN), which is port-based and has dedicated bandwidth; and (2) Ethernet Virtual Private LAN (EVPLAN), which is VLAN-based and has shared bandwidth.

Ethernet Path Protection Switching, as specified in the International Telecommunications Union-Telecommunication Standardization Sector (ITU-T) G.8031 standard, provides an Ethernet path protection switching capability for enabling protection of point-to-point Ethernet paths in Ethernet environments. For example, G.8031 point-to-point (P2P) tunnels may be used to provide fast failover for ELINE services.

Link Aggregation Group (LAG)-like loadsharing solutions are utilized in various types of networks, including Ethernet networks. In some cases, LAG-like loadsharing solutions may be utilized for supporting multipoint ELAN services. For example, LAG-like loadsharing solutions may be utilized for supporting BVPLS ELANs.

Disadvantageously, however, even though both BVPLS ELINE and BVPLS ELAN services may need to be supported within Ethernet networks, no mechanism exists for enabling G.8031 tunnels to co-exist with LAG-like loadsharing solutions within Ethernet networks.

SUMMARY

Various deficiencies in the prior art are addressed by embodiments of an Ethernet protection and loadsharing capability.

In one embodiment, an apparatus includes a processor configured for receiving, at a first Ethernet switch, traffic intended for a second Ethernet switch, and propagating the traffic from the first Ethernet switch toward the second Ethernet switch. The first Ethernet switch is configured to support an Ethernet tunnel endpoint object having a plurality of Ethernet paths associated therewith, where each of the Ethernet paths is a path from the first Ethernet switch to the second Ethernet switch. The traffic is propagated from the first Ethernet switch toward the second Ethernet switch via at least a subset of the Ethernet paths from the first Ethernet switch to the second Ethernet switch.

In one embodiment, an apparatus includes a processor configured for receiving, at a first Ethernet switch, configuration information associated with an Ethernet tunnel between the first Ethernet switch and a second Ethernet switch, and processing the configuration information for causing the first Ethernet switch to associate a plurality of Ethernet paths of the Ethernet tunnel with an Ethernet tunnel endpoint object associated with the Ethernet tunnel.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF ILLUSTRATIVE EMBODIMENTS

An Ethernet protection and loadsharing capability is depicted and described herein. The Ethernet protection and loadsharing capability enables co-existence of both protection and loadsharing for an Ethernet tunnel, having a plurality of associated Ethernet paths, between a pair of Ethernet switches. In one embodiment, the Ethernet protection and loadsharing capability enables co-existence of both G.8031-based protection and Link Aggregation Group (LAG)-like loadsharing for an Ethernet tunnel, having a plurality of associated Ethernet paths, between a pair of Ethernet switches.

Although primarily depicted and described herein with respect to use of the Ethernet protection and loadsharing capability within Provider Ethernet networks implemented as Providing Backbone Bridging Networks (PBBNs), it will be appreciated that the Ethernet protection and loadsharing capability depicted and described herein may be utilized within various other Ethernet networks. For example, the Ethernet protection and loadsharing capability may be used within Provider Ethernet networks and/or Customer Ethernet networks. For example, the Ethernet protection and loadsharing capability may be used within Ethernet networks implemented using one of more of MPLS, PBB networks, PBN networks, Metropolitan Area Networks (MANs), Customer Ethernet networks, and the like, as well as various combinations thereof. Thus, the Ethernet protection and loadsharing capability depicted and described herein may be used within any suitable Ethernet-switched network.

Figure 1:
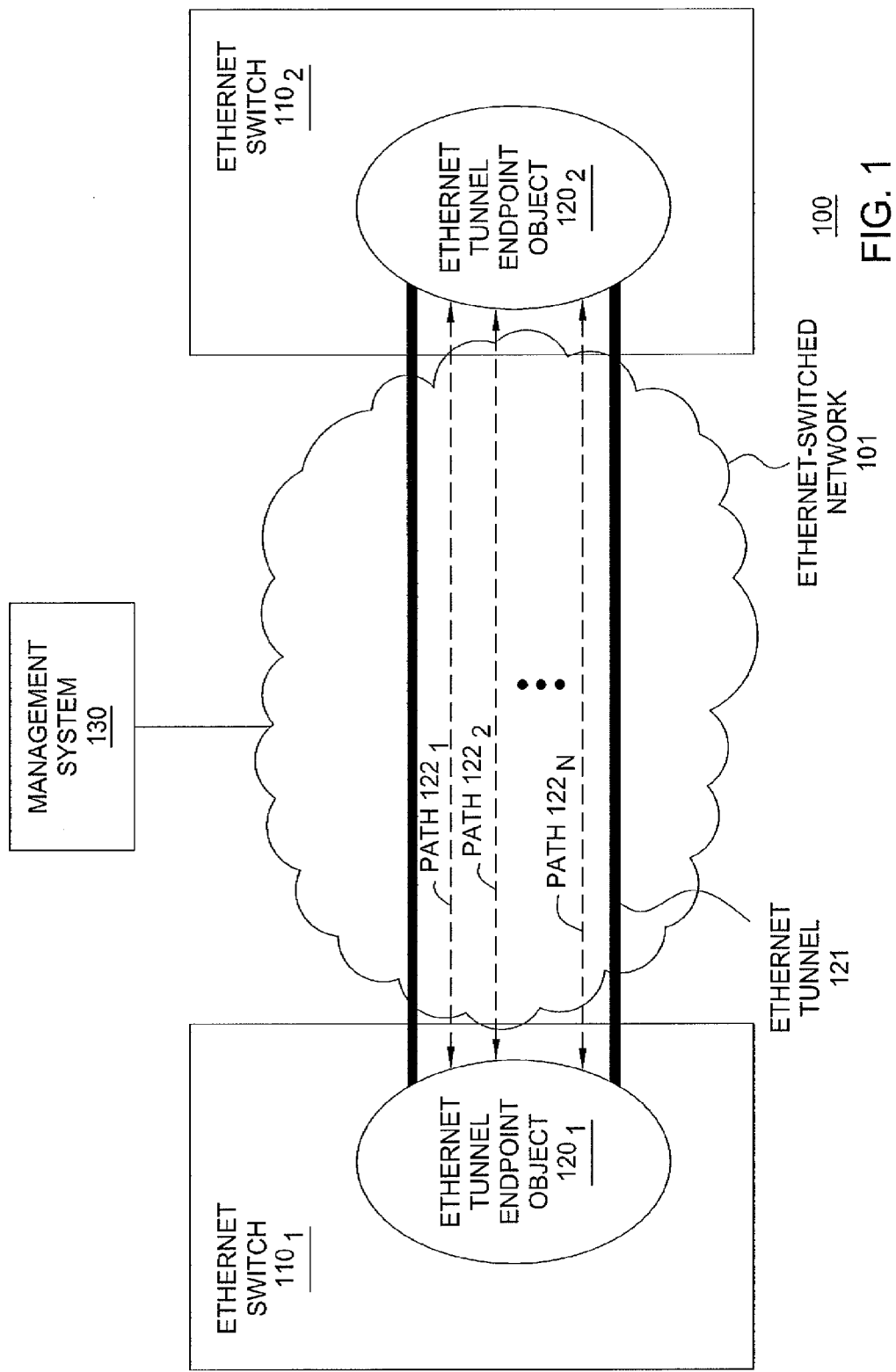
FIG. 1 depicts an exemplary communication system illustrating support for protection and/or loadsharing between a pair of Ethernet switches of an Ethernet-switched network.

FIG. 1 depicts an exemplary communication system illustrating support for protection and/or loadsharing between a pair of Ethernet switches of an Ethernet-switched network.

As depicted in FIG. 1, exemplary communication system 100 of FIG. 1 includes an Ethernet-switched network 101 and a management system (MS) 130. The Ethernet-switched network 101 includes a first Ethernet switch (ES) $110_1$ and a second Ethernet switch (ES) $110_2$ (collectively, ESs 110).

The ESs 110 are configured for performing Ethernet switching within Ethernet-switched network 101. For example, ESs 110 support functions typically supported by Ethernet switches, such as switching of Ethernet frames, interpretation of Virtual Local Area Network (VLAN) tags, and like functions typically supported by Ethernet switches.

The ESs 110 may be any suitable type(s) of Ethernet switches which may be deployed within an Ethernet-switched network. For example, when the exemplary communication system 100 is a Provider Backbone Bridging Network (PBBN), the ESs 110 may be a Backbone Edge Bridge (BEB) and a Backbone Core Bridge (BCB), respectively, or a pair of BCBs. For example, when the exemplary communication system 100 includes portions of a PBBN and a PBN (e.g., an interface between networks), the ESs 110 may include edge bridges of the PBBN and the PBN, respectively. It will be appreciated that the ESs may include any other suitable Ethernet switches which may communicate within an Ethernet-switched network.

The ESs $110_1$ and $110_2$ include a pair of Ethernet tunnel endpoint objects (ETEOs) $120_1$ and $120_2$ (collectively, Ethernet tunnel endpoint objects 120), respectively, associated with an Ethernet tunnel 121 provisioned between the ESs 110. The Ethernet tunnel 121 has a plurality of paths $122_1$-$122_N$ (collectively, paths 122) associated therewith, such that the paths 122 interconnect the Ethernet tunnel endpoint objects 120 on the ESs 110, respectively.

In one embodiment, the Ethernet tunnel endpoint objects 120 are G.8031 Ethernet tunnel endpoint objects and, similarly, the Ethernet tunnel 121 is a G.8031 Ethernet tunnel. The association of the paths 122 with the G.8031 Ethernet tunnel 121, and associated G.8031 Ethernet tunnel endpoint objects 120, provides an expansion of existing G.8031 capabilities to support additional sharing and protection capabilities, as described below.

As depicted in FIG. 1, the paths 122 of Ethernet tunnel 121 connect ESs 110 via Ethernet-switched network 101. Although omitted for purposes of clarity, the Ethernet-switched network 101 may include various networks, network elements, communication links, and the like, which may be disposed between ESs 110. As a result, each of the paths 122 may traverse various combinations of networks, network elements, communication links, and the like, as well as various combinations thereof. An exemplary path 122 between ESs $110_1$ and $110_2$ is depicted and described with respect to FIG. 2.

Figure 2:
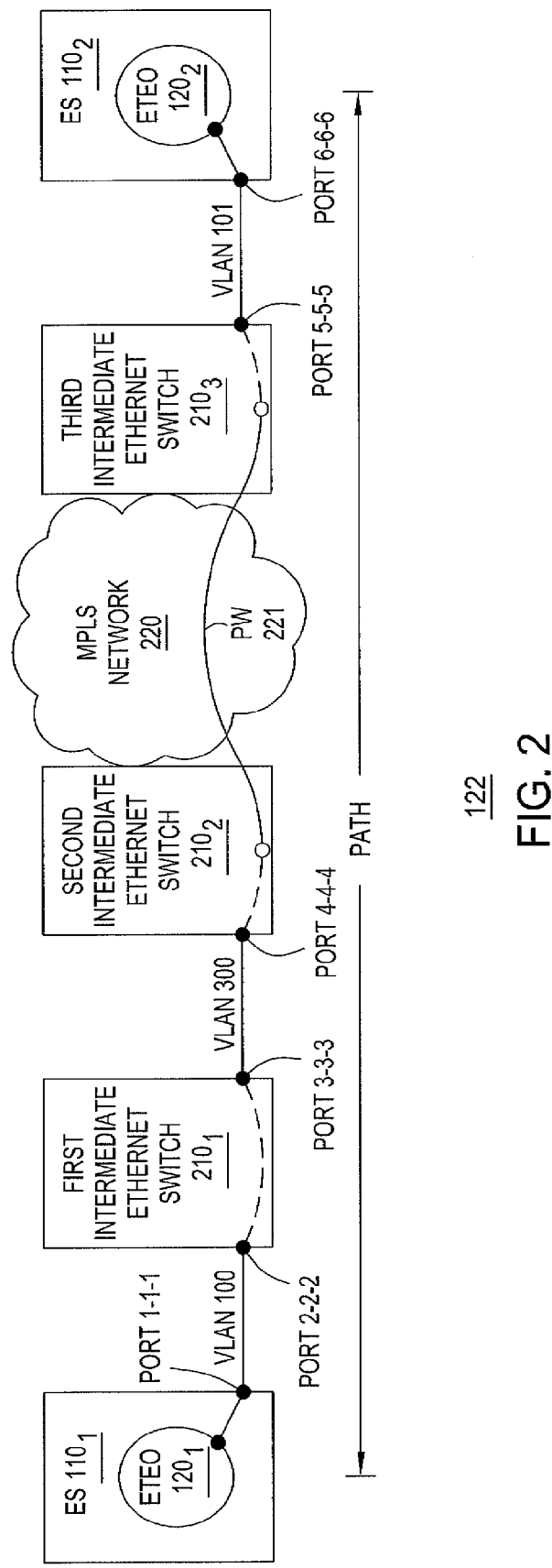
FIG. 2 depicts an exemplary path of the Ethernet-switched network of the exemplary communication system of FIG. 1.

FIG. 2 depicts an exemplary path of the Ethernet-switched network of the exemplary communication system of FIG. 1.

As depicted in FIG. 2, a path 122 is configured between a first ES $110_1$ and a second ES $110_2$, which are the ESs 110 of FIG. 1.

In the direction from the first ES $110_1$ to the second ES $110_2$, the path 122: (1) begins at the first ES $110_1$, (2) traverses a first intermediate Ethernet switch $210_1$, a second intermediate Ethernet switch $210_2$, an MPLS network 220 supporting a pseudowire (PW) 221, and a third intermediate Ethernet switch $210_3$, and (3) ends at the second ES $110_1$. More specifically, path 122 begins at Ethernet tunnel endpoint object $120_1$ on first ES $110_1$, exits first ES $110_1$ via an output port 1-1-1 on a VLAN having a VLAN ID 100, enters first intermediate Ethernet switch $210_1$ via an input port 2-2-2 on the VLAN having VLAN ID 100, is switched within the first intermediate Ethernet switch $210_1$, exits first intermediate Ethernet switch $210_1$ via an output port 3-3-3 on a VLAN having a VLAN ID 300, enters second intermediate Ethernet switch $210_2$ via an input port 4-4-4 on the VLAN having the VLAN ID 100, is switched within second intermediate Ethernet switch $210_2$, exits second intermediate Ethernet switch $210_2$ via the PW 221 established between the second intermediate Ethernet switch $210_2$ and the third intermediate Ethernet switch $210_3$ via MPLS network 220, enters third intermediate Ethernet switch $210_3$ via the PW 221 established between the second intermediate Ethernet switch $210_2$ and the third intermediate Ethernet switch $210_3$ via MPLS network 220, is switched within third intermediate Ethernet switch $210_3$, exits third intermediate Ethernet switch $210_3$ via an output port 5-5-5 on a VLAN having a VLAN ID 101, enters second ES $110_2$ via an input port 6-6-6 on the VLAN having VLAN ID 101, and ends at Ethernet tunnel endpoint object $120_2$ on second ES $110_2$.

It will be appreciated that path 122 of FIG. 2 is merely exemplary, and that the path 122 may traverse any other suitable type(s), number(s), and/or arrangement(s) of networks, network elements, communication links, and the like, as well as various combinations thereof.

It will be appreciated that the exemplary path 122 of FIG. 2 may be used for any of the paths 122 of FIG. 1, and that any of the paths 122 may be configured in any suitable manner using any suitable underlying infrastructure of an Ethernet-switched network.

In one embodiment, the paths 122 of Ethernet tunnel 121 are used to provide protection and/or loadsharing capabilities.

In one embodiment, for example, the paths 122 of Ethernet tunnel 121 may be used to provide a protection mode. In the protection mode, N-M of the paths 122 of Ethernet tunnel 121 are active and M of the paths 122 of the Ethernet tunnel 121 is/are configured as a backup path(s) providing protection for the N-M active paths of Ethernet tunnel 121. In this case, M may be equal to or greater than one (e.g., the case where M=1 provides an N:1 protection mode and the case where M>1 provides an N:M protection mode). It will be appreciated that the loadsharing mode may be considered to be a special case of the protection mode in which M=0.

In the protection mode, an ES 110, in response to identifying a failure of one or more of the active paths 122, switches traffic from the failed active path(s) 122 to the backup path 122 (or backup paths 122, when necessary or desired, in the case of the N:M protection mode). In providing protection, each of the ESs 110 performs various functions, such as path monitoring and failure detection functions for detecting the failure of paths 122, path failover functions for switching traffic from failed active paths 122 to backup paths 122, and the like, as well as various combinations thereof.

In one embodiment, for example, path monitoring and failure detection may be implemented in a manner for enabling each ES 110 to detect path failures independent of the other ES 110 (rather than one of the ESs 110 having to explicitly signal the other one of the ESs 110 in response to detection of a failure). In one such embodiment, for example, the ESs 110 may exchange Ethernet OAM frames for purposes of monitoring the status of each of the paths 122. In one embodiment, for example, each ES 110, for each of the active paths 122 of Ethernet tunnel 121 (and, optionally, for any backup path(s)), may send an OAM frame to the other ES 110 periodically (e.g., once every 5 ms, once every 10 ms, or using any other suitable length of time) such that an ES 110, in response to not having received a threshold number of OAM frames (e.g., 3 missing OAM frames, 5 missing OAM frames, or any other suitable threshold) on a given path 122, identifies a failure of the given path 122. In this manner, each of ESs 110 will be able to detect the failure of paths 122.

In one embodiment, for example, path monitoring and failure detection may be implemented in a manner for enabling one of the ESs 110 to detect path failures of paths 122 and to signal the other of the ESs 110 when failure of one or more of the paths 122 is detected. In this embodiment, the path monitoring and failure detection functionality only needs to be implemented on one of the ESs 110.

In general, the, path failover functions for switching traffic from a failed active path(s) 122 to a backup path(s) 122 may be provided using any suitable path failover scheme configured for enabling traffic to be transitioned from one or more failed active paths 122 to one or more backup paths 122. In one embodiment, for example, in which the Ethernet tunnel 121 is a G.8031 Ethernet tunnel (and Ethernet tunnel endpoint objects 120 are G.8031 Ethernet tunnel endpoint objects), path failover may be provided as described in the G.8031 specification. In one embodiment, for example, path failover may be provided using one or more other path failover schemes. In one embodiment, ESs 110 communicate during path failover for purposes of ensuring that the ESs 110 remain synchronized with respect to the paths 122 on which traffic is being transported. The path failover functions, for switching traffic from one or more failed active paths 122 to one or more backup paths 122, may be provided using any other suitable path failover scheme(s).

It will be appreciated that various combinations of such embodiments may be used.

It will be further appreciated that although primarily depicted and described with respect to specific types of path monitoring and failure detection functions for detecting the failure of paths 122, path failover functions for switching traffic from failed active paths 122 to backup paths 122, and the like, various other types of path monitoring and failure detection functions, path failover functions, and the like may be used to provide various embodiments of the Ethernet protection and loadsharing capability depicted and described herein.

In one embodiment, for example, the paths 122 of Ethernet tunnel 121 may be used to provide a loadsharing mode. In the loadsharing mode, each of the paths 122 of Ethernet tunnel 121 is active and, thus, may be used for propagating traffic between the ESs 110, thereby enabling more efficient use of network resources.

In the loadsharing mode, load balancing between the paths 122 of Ethernet tunnel 121 may be performed in any suitable manner. In one embodiment, for example, load balancing between the paths 122 of Ethernet tunnel 121 may be performed using a LAG-like loadsharing scheme. For example, load balancing across the paths 122 may be based on one or more parameters (e.g., source/destination IP addresses, source/destination MAC addresses, and the like, as well as various combinations thereof). The load balancing between the paths 122 of Ethernet tunnel 121 may be performed in any other suitable manner.

In one embodiment, a combination of protection and loadsharing modes may be supported. In one such embodiment, loadsharing may be provided on the N-M active paths 122 of Ethernet tunnel 121 and the M backup paths of Ethernet tunnel 121 may still be used to protect the N-M active paths 122 of Ethernet tunnel 121.

In one embodiment, a control plane is implemented between ESs 110 for purposes of communicating information related to providing protection and/or loadsharing modes. For example, a control plane between ESs 110 may be used by the ESs 110 to exchange information enabling the ESs 110 to synchronize which paths 122 are associated with which Ethernet tunnel endpoint objects 120/Ethernet tunnels 121, which paths 122 are active and which paths 122 are backup for a given Ethernet tunnel 121, and the like, as well as various combinations thereof. In this embodiment, the exchanges of information between ESs 110 may be performed using any suitable protocol or protocols. In one embodiment, for example, the LAG Protocol defined in the 802.1d standard may be used to support communications within the control plane between the ESs 110. In one embodiment, for example, a protocol similar in operation to the LAG Protocol defined in the 802.1d standard may be used to support communications within the control plane between the ESs 110. The exchange of information between ESs 110 within the context of the control plane may be provided using any other suitable protocol(s).

As depicted in FIG. 1, exemplary communication system 100 includes MS 130. The MS 130 is configured to provide various management functions for the Ethernet-switched network 101. For example, the MS 130 may provide configuration functions (e.g., for configuring ESs 110 to support protection and/or loadsharing modes), path provisioning functions (e.g., for provisioning the paths of an Ethernet tunnel used to support protection and/or loadsharing modes), service provisioning functions, fault and/or performance monitoring functions, and the like, as well as various combinations thereof.

In one embodiment, the MS 130 is configured to generate configuration information for the ESs 110 and to provide the configuration information to the ESs 110 for configuring the ESs 110 according to the generated configuration information, and each of the ESs 110 is configured to receive the configuration information from MS 130 and to process the configuration information such that the ESs 110 are configured according to the configuration information received from MS 130. For example, configuration information may include information for one or more of configuring ESs 110 to support respective Ethernet tunnel endpoint objects 120, configuring ESs 110 to associate the Ethernet tunnel 121 with the respective Ethernet tunnel endpoint objects 120, configuring ESs 110 to associate the paths 122 with respective Ethernet tunnel endpoint objects 120 and Ethernet tunnel 121, and the like, as well as various combinations thereof.

In one embodiment, the MS 130 is configured to generate path provisioning information and to provide the path provisioning information to network elements for configuring the network elements according to the generated path provisioning information, thereby enabling establishment of the paths of an Ethernet tunnel (e.g., such as for establishing paths 122 of Ethernet tunnel 121 provided between ESs 110).

The MS 130 may provide various other management functions (e.g., associated with providing the Ethernet protection and loadsharing capability depicted and described herein, unrelated to providing the Ethernet protection and loadsharing capability depicted and described herein, and the like, as well as various combinations thereof).

Figure 3:
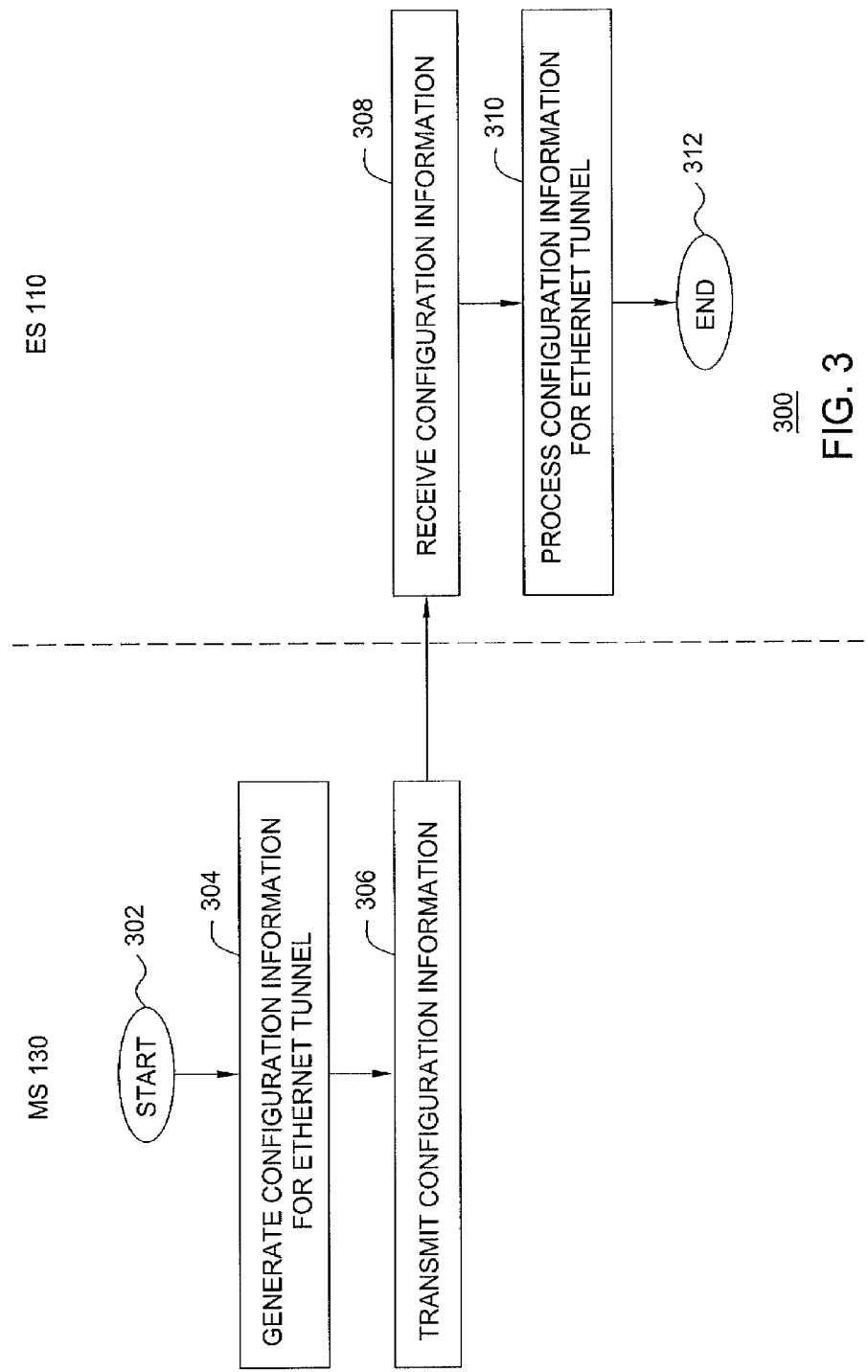
FIG. 3 depicts one embodiment of a method for configuring an Ethernet switch of FIG. 1 to support protection and/or loadsharing.

FIG. 3 depicts one embodiment of a method for configuring an Ethernet switch of FIG. 1 to support G.8031 protection and LAG-like loadsharing. As depicted in FIG. 3, method 300 includes steps performed by the MS 130 and one of the ESs 110 of FIG. 1.

At step 302, method 300 begins.

At step 304, the MS 130 generates configuration information adapted for use in configuring the ES 110 to support protection and/or loadsharing capabilities for an Ethernet tunnel. The configuration information may be initial configuration information for providing an initial configuration on the ES 110, reconfiguration information for providing for reconfiguration of the ES 110 in response to an event (e.g., provisioning of additional paths for the Ethernet tunnel, detection of a condition in the network, and the like, as well as various combinations thereof). The configuration information may be generated in response to any suitable request (e.g., in response to a detected event, in response to a request initiated by a user of the MS 130, and the like, as well as various combinations thereof). The configuration information may include any information adapted for use in configuring the ES 110 to support protection and/or loadsharing capabilities for an Ethernet tunnel (e.g., configuring the Ethernet tunnel endpoint object on the ES 110 for the Ethernet tunnel, associating the Ethernet tunnel with an Ethernet tunnel endpoint object on the ES 110, associating paths of the Ethernet tunnel to the Ethernet tunnel endpoint object on the ES 110, and the like, as well as various combinations thereof).

At step 306, the MS 130 transmits the configuration information to the ES 110.

At step 308, the ES 110 receives the configuration information from the MS 130.

At step 310, the ES 110 processes the configuration information such that the ES 110 is configured to support the protection and/or loadsharing capabilities for an Ethernet tunnel. As described herein, configuration of the ES 110 to support protection and/or loadsharing capabilities for the Ethernet tunnel, via processing of the configuration information, may include configuring the Ethernet tunnel endpoint object on the ES 110 for the Ethernet tunnel, associating the Ethernet tunnel with an Ethernet tunnel endpoint object on the ES 110, associating paths of the Ethernet tunnel to the Ethernet tunnel endpoint object on the ES 110, and the like, as well as various combinations thereof.

At step 312, method 300 ends.

Figure 4:
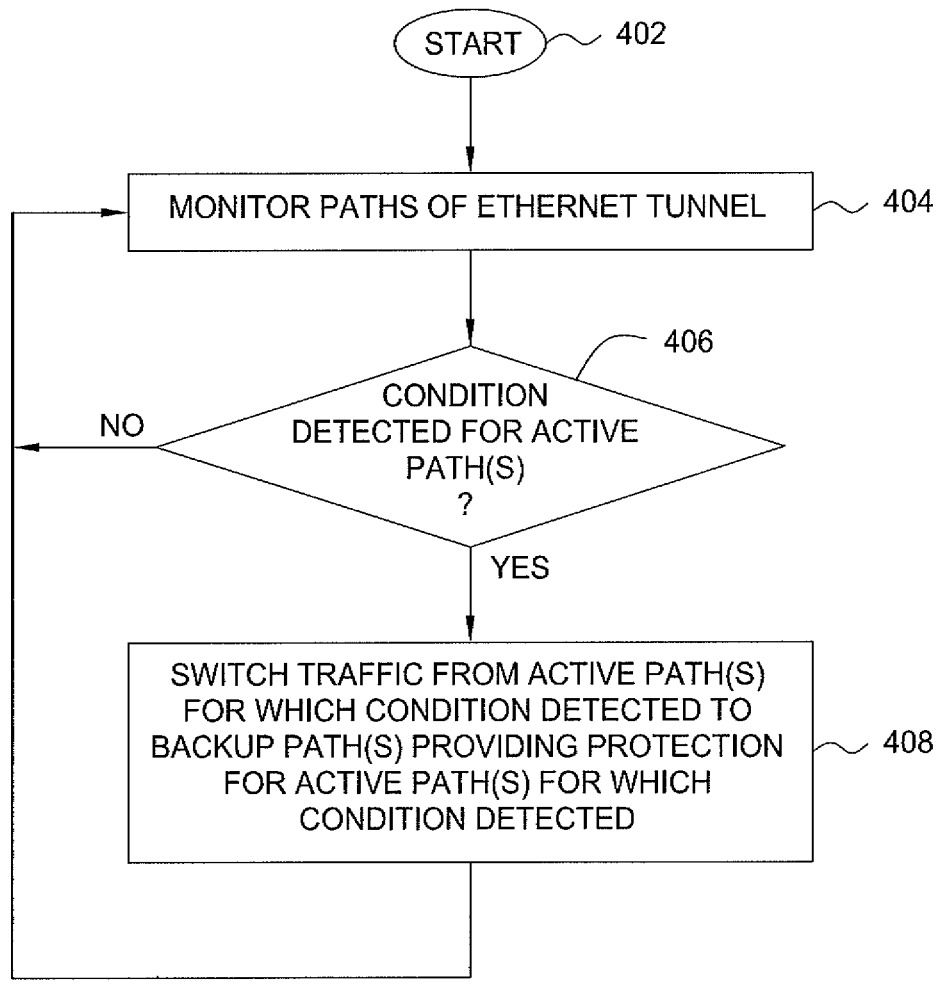
FIG. 4 depicts one embodiment of a method executed by a first Ethernet switch to provide path protection for paths of an Ethernet tunnel between the first Ethernet switch and a second Ethernet switch.

FIG. 4 depicts one embodiment of a method executed by a first Ethernet switch to provide path protection for paths of an Ethernet tunnel between the first Ethernet switch and a second Ethernet switch.

At step 402, method 400 begins.

At step 404, the paths of the Ethernet tunnel are monitored. The monitoring of the paths includes monitoring of the active paths of the Ethernet tunnel and may include monitoring of the one or more backup paths of the Ethernet tunnel. The paths of the Ethernet tunnel are monitored for purposes of detecting conditions which may trigger switching of traffic from one or more of the active paths to one or more backup paths.

At step 406, a determination is made as to whether a condition is detected for an active path(s). As noted above, the condition may include any condition which may trigger switching of traffic from one or more of the active paths to one or more backup paths (e.g., degradation of the active path(s), failure of the active path(s), and the like).

If a condition is not detected for an active path(s), the method 400 returns to step 404, i.e., monitoring of the paths of the Ethernet tunnel continues.

If a condition is not detected for an active path(s), the method 400 proceeds to step 408. At step 408, traffic is switched from the active path(s) identified as having a condition associated therewith to one or more backup paths. From step 408, method 400 returns to step 404.

Although omitted from method 400 of FIG. 4 for purposes of clarity, it will be appreciated that different protection modes may be supported for an Ethernet tunnel (e.g., an N:1 protection mode in which a single backup path of the Ethernet tunnel provides protection for all active paths of the Ethernet tunnel, an N:M protection mode in which multiple backup paths of the Ethernet tunnel provide protection for the active paths of the Ethernet tunnel, and the like).

Figure 5:
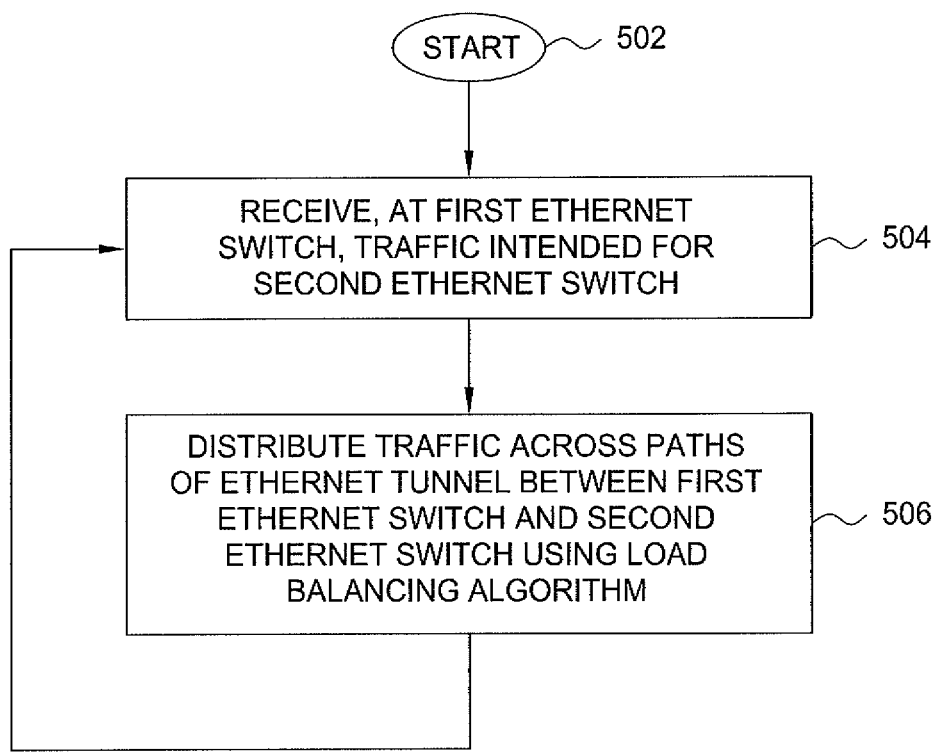
FIG. 5 depicts one embodiment of a method executed by a first Ethernet switch to provide loadsharing across paths of an Ethernet tunnel between the first Ethernet switch and a second Ethernet switch.

FIG. 5 depicts one embodiment of a method executed by a first Ethernet switch to provide loadsharing across paths of an Ethernet tunnel between the first Ethernet switch and a second Ethernet switch.

At step 502, method 500 begins.

At step 504, the first Ethernet switch receives traffic intended for the second Ethernet switch.

At step 506, the first Ethernet switch distributes the received traffic across paths of the Ethernet tunnel between the first Ethernet switch and the second Ethernet switch using a load balancing algorithm.

As depicted in FIG. 5, from step 506 method 500 returns to step 504, thereby indicating that as the first Ethernet switch continues to receive traffic intended for the second Ethernet switch, the first Ethernet switch continues to apply the load balancing algorithm to balance the traffic across paths of the Ethernet tunnel.

Although depicted and described as separate methods, it will be appreciated that the methods 400 and 500 of FIGS. 4 and 5, respectively, may be used in conjunction with each other (e.g., as two separately executed processes or as a single combined process) to support both protection and loadsharing for an Ethernet tunnel between Ethernet switches.

As described herein, the Ethernet protection and loadsharing capability may be supported between any suitable pair of Ethernet switches capable of communicating via an Ethernet-switched network. In order to provide a better understanding of various embodiments of the Ethernet protection and loadsharing capability, exemplary applications of various embodiments of the Ethernet protection and loadsharing capability to a specific type of Ethernet-switched network (namely, a PBBN) are depicted and described herein with respect to FIGS. 6-8.

Figure 6:
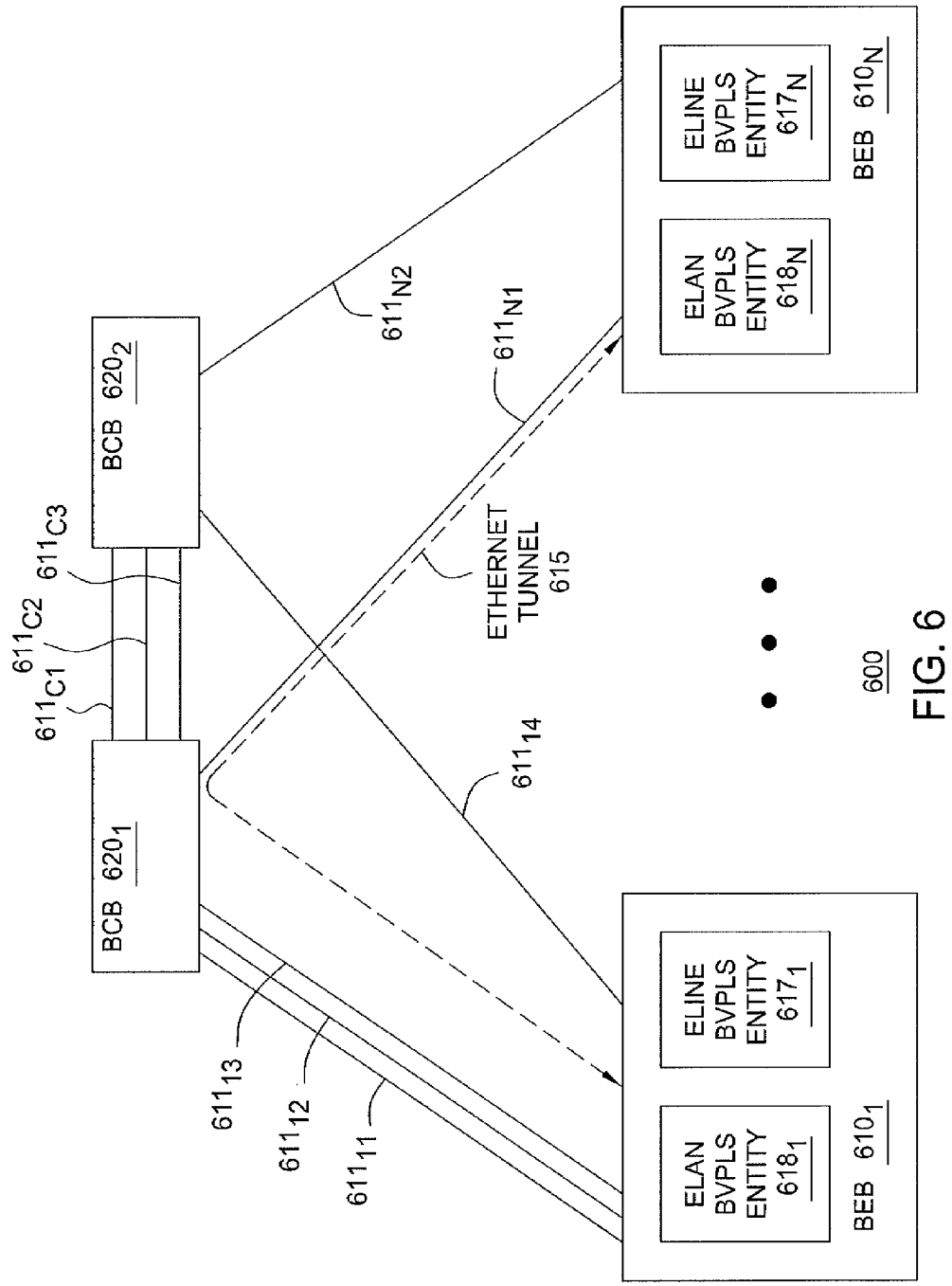
FIG. 6 depicts an exemplary communication system illustrating use of G.8031 protection and LAG-like loadsharing for an Ethernet tunnel between edge devices of a Provider Backbone Bridging Network (PBBN)

FIG. 6 depicts an exemplary communication system illustrating use of G.8031 protection and LAG-like loadsharing for an Ethernet tunnel between edge devices of a Provider Backbone Bridging Network (PBBN).

As depicted in FIG. 6, G.8031 protection and LAG-like loadsharing is provided within a Provider Backbone Bridging Network (PBBN) 600.

The PBBN 600 is an Ethernet-switched networks, e.g., an example of Ethernet-switched network 101 depicted and described with respect to FIG. 1.

In one embodiment, PBBN 600 is implemented as described in the IEEE 802.1ah standard.

The PBBN 600 includes a plurality of bridges, including a plurality of Backbone Edge Bridges (BEBs) $610_1$-$610_N$ (collectively, BEBs 610) and two Backbone Core Bridges (BCBs) $620_1$ and $620_2$ (collectively, BCBs 620).

The BEB $610_1$ is communicatively connected to BCB $620_1$ and BCB $620_2$ via communication links (CLs) $611_1$. Namely, BEB $610_1$ is connected to BCB $620_1$ via a plurality of CLs $611_{11}$-$611_{13}$ and is connected to BCB $620_2$ via a single CL $611_{14}$, where CLs $611_{11}$-$611_{14}$ are referred to collectively as CLs $611_1$. Although primarily depicted and described with respect to specific numbers and arrangements of CLs $611_1$, it will be appreciated that other numbers and/or arrangements of CLs $611_1$ may be used to provide communication between BEB $610_1$ and core bridges.

The BEB $610_N$ is communicatively connected to BCB $620_1$ and BCB $620_2$ via communication links (CLs) $611_N$. Namely, BEB $610_N$ is connected to BCB $620_1$ via a CL $611_{N1}$ and is connected to BCB $620_2$ via a CL $611_{N2}$, where CLs $611_{N1}$ and $611_{N2}$ are referred to collectively as CLs $611_N$. Although primarily depicted and described herein with respect to specific numbers and arrangements of CLs $611_N$, it will be appreciated that other numbers and/or arrangements of CLs $611_N$ may be used to provide communication between BEB $610_N$ and core bridges.

The BCBs $620_1$ and $620_2$ are communicatively coupled via a plurality of CLs $611_{C1}$-$611_{C3}$. Although primarily depicted and described herein with respect to specific numbers and arrangements of CLs $611_C$, it will be appreciated that other numbers and/or arrangements of CLs $611_C$ may be used to facilitate communications between core bridges.

Although primarily depicted and described with respect to specific numbers and arrangements of BEB 610 and BCBs 620, it will be appreciated that other numbers and/or arrangements of BEB 610 and/or BCBs 620 may be used to provide a PBBN.

As depicted in FIG. 6, an Ethernet tunnel 615 is configured between BEB $110_1$ and BEB $110_N$ via BCB $120_1$. The Ethernet tunnel 615 includes a plurality of Ethernet paths (omitted for purposes of clarity). For example, the Ethernet tunnel 615 may be an Ethernet tunnel such as the Ethernet tunnel 121 depicted and described with respect to FIG. 1 and, similarly, the Ethernet paths of Ethernet tunnel 615 may be Ethernet paths such as the Ethernet paths 122 depicted and described with respect to FIG. 1. As described with respect to FIGS. 1 and 2, the Ethernet paths of an Ethernet tunnel, such as Ethernet tunnel 615 of FIG. 6, may traverse different physical paths through the Ethernet-switched network. For example, with respect to BEB $610_1$, the Ethernet paths of Ethernet tunnel 615 may traverse different ones of the CLs $611_1$ between BEB $610_1$ and BCB $620_1$.

In one embodiment, G.8031 protection and LAG-like loadsharing are provided for Ethernet path 615.

In one such embodiment, G.8031 protection and LAG-like loadsharing are provided for Ethernet path 615 within the context of one or more services which may be transported via Ethernet tunnel 615. For example, the Metro Ethernet Forum (MEF) has specified two Ethernet services that replace traditional static permanent virtual circuits with Ethernet virtual circuits (EVCs). As described herein, these two Ethernet services are ELINE and ELAN, both of which may be offered as private or virtual services where private services are transported via dedicated lines and connections at fixed and predefined wire speeds and virtual services are multiplexed statistically and transported over shared lines and connections.

The ELINE and ELAN services may be used in various types of networks and/or for various types of applications. In some cases, for example, ELINE and/or ELAN services may be used within a PBBN using native Ethernet, such as PBBN 600 of FIG. 6. In such cases, the ELINE and ELAN services may be implemented as Backbone VPLS (BVPLS) services and, thus, may be referred to as ELINE BVPLS and ELAN BVPLS. In such cases, ELINE BVPLS and/or ELAN BVPLS services may be used between BEBs via BCBs, such as between BEBs 610 via BCBs 620 of PBBN 600 of FIG. 6.

As depicted in FIG. 6, in order to support ELINE BVPLS services, each of the BEBs 610 of PBBN 600 includes a respective ELINE BVPLS entity. Namely, BEBs $610_1$-$610_N$ include ELINE BVPLS entities $617_1$-$617_N$ (collectively, ELINE BVPLS entities 617). In one embodiment, the ELINE BVPLS services may utilize G.8031 protection switching capabilities in order to provide fast failover for ELINE BVPLS services.

As depicted in FIG. 6, in order to support ELAN BVPLS services, each of the bridges of PBBN 600 includes a respective ELAN BVPLS entity. Namely, BEBs $610_1$-$610_N$ include respective ELAN BVPLS entities $618_{E1}$-$618_{EN}$ (collectively, ELAN BVPLS entities $618_E$), and BCBs $620_1$ and $620_2$ include respective ELAN BVPLS entities $618_{C1}$ and $618_{C2}$ (collectively, ELAN BVPLS entities $618_C$). In one embodiment, the ELAN BVPLS services may utilize protocols such as Multiple Spanning Tree Protocol (MSTP), Multiple MAC Registration Protocol (MMRP), and the like, as well as various combinations thereof.

As described herein, the Ethernet protection and loadsharing capability enables co-existence of G.8031-based protection and LAG-like loadsharing on the Ethernet paths of an Ethernet tunnel (illustratively, Ethernet tunnel 615 of FIG. 6).

As described herein, in one embodiment, coexistence of G.8031-based protection and LAG-like loadsharing on Ethernet paths of an Ethernet tunnel is provided using one or more Ethernet tunnel endpoint objects. In one such embodiment, for example, coexistence of G.8031-based protection and LAG-like loadsharing is provided using a combination of Ethernet tunnel endpoint objects from the G.8031 standard. An exemplary embodiment is depicted and described with respect to FIG. 7.

As described herein, in one embodiment, coexistence of G.8031-based protection and LAG-like loadsharing on Ethernet paths of an Ethernet tunnel is provided using LAG emulation. In one such embodiment, coexistence of G.8031-based protection and LAG-like loadsharing is provided using an Ethernet tunnel endpoint objects from the G.8031 standard. An exemplary embodiment is depicted and described with respect to FIG. 8.

Figure 7:
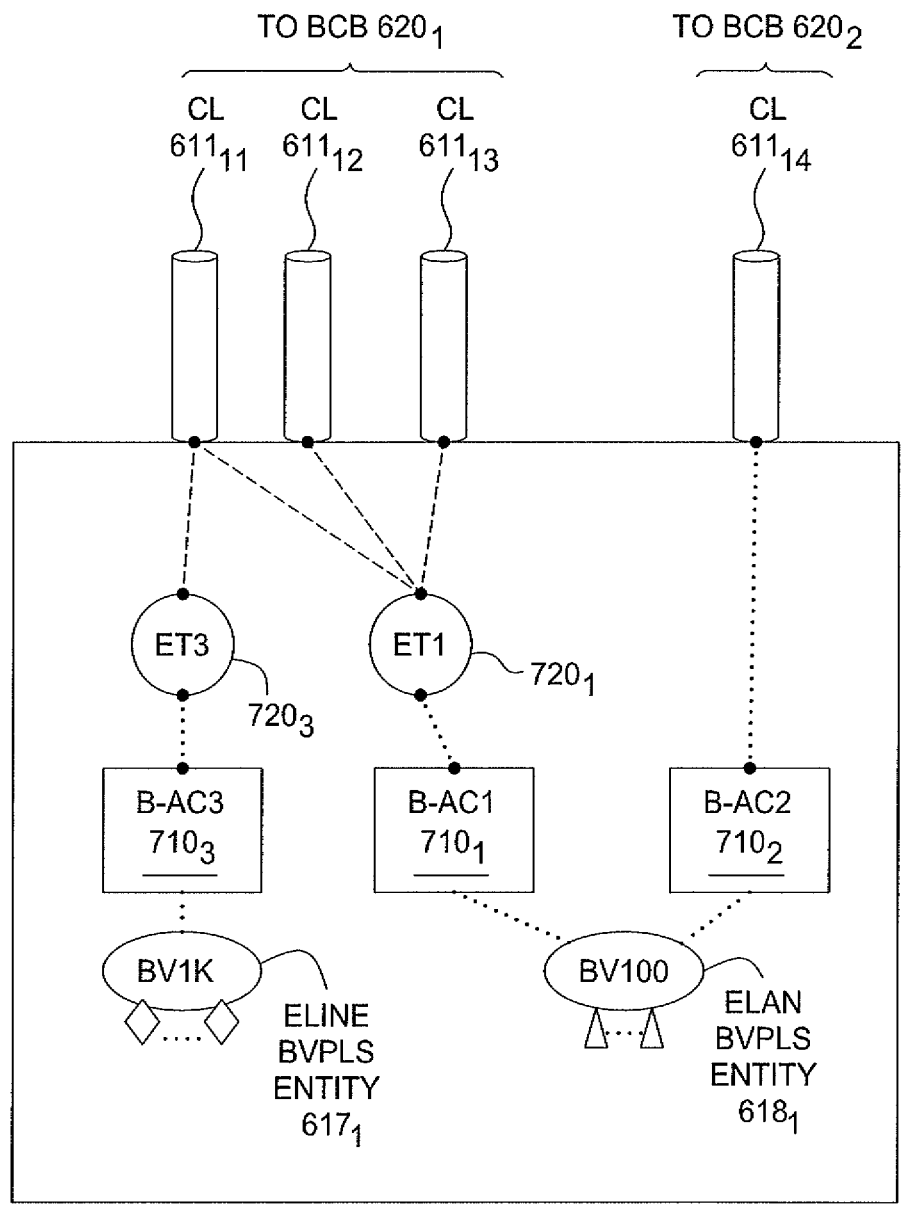
FIG. 7 depicts an exemplary embodiment of one of the edge bridges of the PBBN of FIG. 6, illustrating coexistence of G.8031-based protection and LAG-like loadsharing on Ethernet paths of an Ethernet tunnel using G.8031 Ethernet tunnel endpoint objects.

FIG. 7 depicts an exemplary embodiment of one of the edge bridges of the PBBN of FIG. 6, illustrating coexistence of G.8031-based protection and LAG-like loadsharing on Ethernet paths of an Ethernet tunnel using G.8031 Ethernet tunnel endpoint objects.

As depicted in FIG. 7, an exemplary embodiment of BEB $610_1$ of PBBN 600 of FIG. 6 is depicted.

As depicted in FIGS. 6 and 7, the BEB $610_1$ includes communication links and BVPLS entities as follows: (1) three CLs $611_{11}$-$611_{13}$ providing three different communication paths to BCB $620_1$ and one CL $611_{14}$ providing a communication path to BCB $620_2$; and (2) ELINE BVPLS entity $617_1$ (denoted with an exemplary identifier BV1000 and having services associated therewith) and ELAN BVPLS entity $618_1$ (denoted with an exemplary identifier BV100 and having services associated therewith).

As depicted in FIG. 7, the BEB $610_1$ includes three provider/backbone-facing Attachment Circuits (B-ACs) denoted as B-AC1 $710_1$, B-AC2 $710_2$, and B-AC3 $710_3$ (collectively, B-ACs 710) and, further, includes two Ethernet tunnel endpoint objects ET1 $720_1$ and ET3 $720_3$ (collectively, Ethernet tunnel endpoint objects 720).

The ELINE BVPLS entity $617_1$ maps through B-AC3 $710_3$ to Ethernet tunnel endpoint object ET3 $720_3$, which in turn maps to one of the three CLs $611_1$ between BEB $610_1$ and BCB $620_1$ (illustratively, CL $611_{11}$, although any of the other CLs $611_1$ may be used). In one embodiment, the Ethernet tunnel endpoint object ET3 $720_3$ uses the G.8031 protection mode (e.g., primary and backup paths) such as the G.8031 protection mode defined in the G.8031 standard.

The ELAN BVPLS entity $618_1$ maps as follows: (1) through B-AC1 $710_1$ to Ethernet tunnel endpoint object ET1 $720_1$, which in turn maps to each of the three CLs $611_1$ between BEB $610_1$ and BCB $620_1$, and (2) through B-AC2 $710_2$ to the CL $611_{14}$ between BEB $610_1$ and BCB $620_2$. In one embodiment, Ethernet tunnel endpoint object ET1 $720_1$ uses the loadsharing mode and/or the protection mode to distribute ELAN BVPLS traffic over the Ethernet paths of Ethernet tunnel 615 (illustratively, distributing over the CLs 611 between BEB $610_1$ and BCB $620_1$). In this embodiment, the Ethernet tunnel endpoint object ET1 $720_1$ emulates a LAG behavior, thereby enabling co-existence with G.8031 traffic that is pinned to one or more of the CLs 611 between BEB $610_1$ and BCB $620_1$.

In one embodiment, on BCB $620_1$, Ethernet tunnel endpoint object ET1 $720_1$ of BEB $610_1$ is terminated in an associated ELAN BVPLS entity on BCB $620_1$ and co-exists with a regular B-AC that transparently connects the two transit points of the Ethernet tunnel associated with the Ethernet tunnel endpoint object ET3 $720_3$ of BEB $610_1$.

Figure 8:
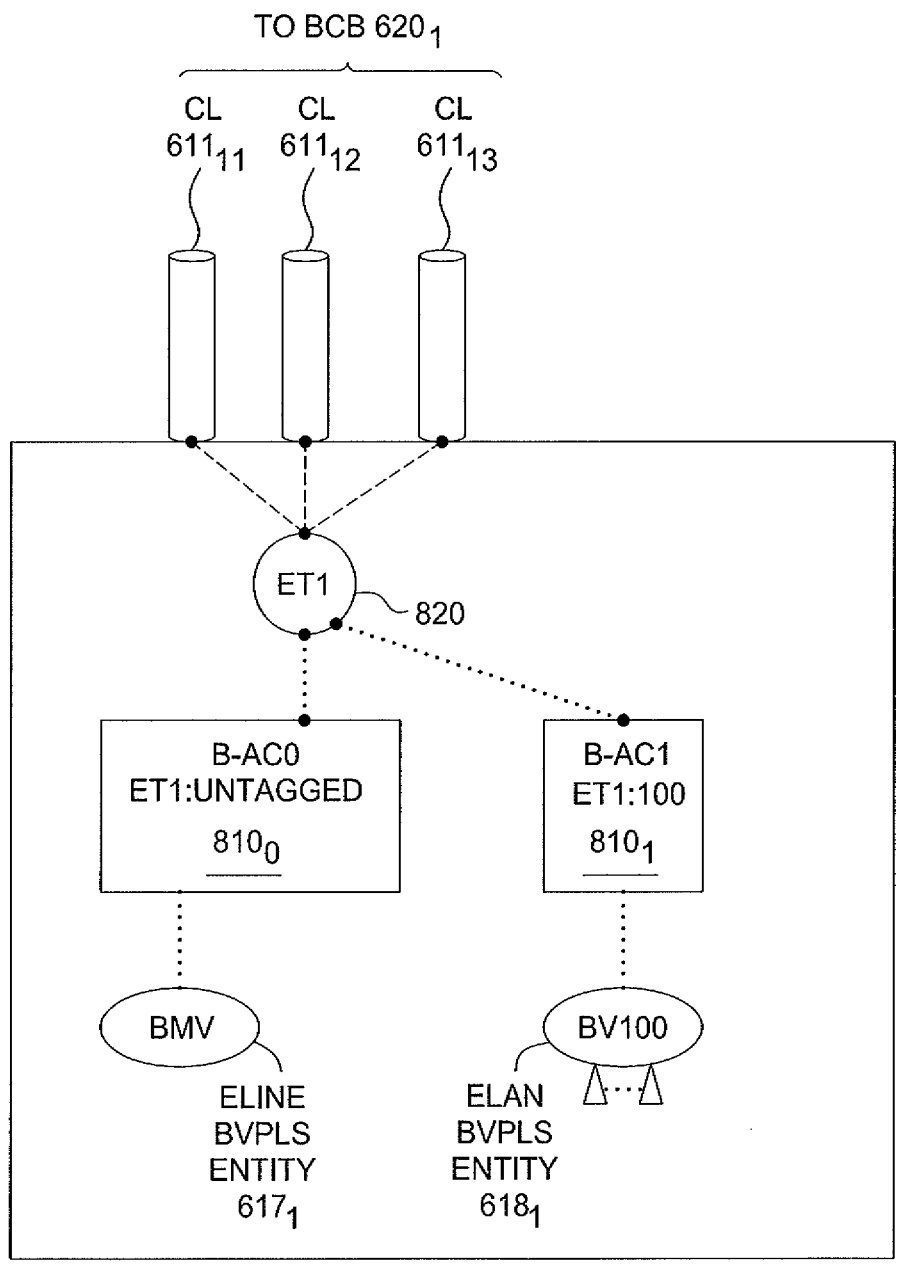
FIG. 8 depicts an exemplary embodiment of one of the edge bridges of the PBBN of FIG. 6, illustrating coexistence of G.8031-based protection and LAG-like loadsharing on Ethernet paths of an Ethernet tunnel using G.8031 Ethernet tunnel endpoint objects.

FIG. 8 depicts an exemplary embodiment of one of the edge bridges of the PBBN of FIG. 6, illustrating coexistence of G.8031-based protection and LAG-like loadsharing on Ethernet paths of an Ethernet tunnel using G.8031 Ethernet tunnel endpoint objects.

As depicted in FIG. 8, an exemplary embodiment of BEB $610_1$ of PBBN 600 of FIG. 6 is depicted.

As depicted in FIGS. 6 and 8, the BEB $610_1$ includes communication links and BVPLS entities as follows: (1) three CLs $611_{11}$-$611_{13}$ providing three different communication paths to BCB $620_1$; and (2) ELINE BVPLS entity $617_1$ (denoted with an exemplary identifier BMV, indicative that the ELINE BVPLS entity $617_1$ is associated with a Backbone Management VPLS (BMV)) and ELAN BVPLS entity $618_1$ (denoted with an exemplary identifier BV100 and having services associated therewith).

As depicted in FIG. 8, the BEB $610_1$ includes two B-ACs denoted as B-AC0 $810_0$ and B-AC1 $810_1$ (collectively, B-ACs 810) and, further, includes an Ethernet tunnel endpoint objects ET1 820.

The ELINE BVPLS entity $617_1$ maps through B-AC0 $810_0$ to Ethernet tunnel endpoint object ET1 820, which in turn maps to each of the three CLs $611_1$ between BEB $610_1$ and BCB $620_1$. In one embodiment, the BMV is used to define the context for P-MSTP used in the PBBN 600 for multipoint BVPLS instances.

In one embodiment, the Ethernet tunnel endpoint object ET1 820 uses the Link Aggregation Control Protocol (LACP) or another suitable protocol in order to emulate a LAG between BEB $610_1$ and BCB $620_1$, with CLs $611_1$-$611_3$ being members of the Ethernet tunnel 615. In one such embodiment, the protocol (e.g., LACP or other suitable protocol) may be implemented as a new protection mode under the Ethernet tunnel endpoint object ET1 820 for interoperability reasons, e.g., for enabling interoperable LAG support on both the access (I-AC) and core (B-AC) sides, co-existing with G.8031 on one or more of the associated ports.

In one embodiment, B-AC0 $810_0$ is untagged. In one embodiment, B-AC0 $810_0$ is used to add the Ethernet tunnel endpoint object ET1 820 to the context managed by the BVM. In one embodiment, the Provider Multiple Spanning Tree Protocol (P-MSTP) is enabled on B-AC0 $810_0$ and will merely see it as another virtual port (e.g., as in the case of other B-ACs mapped to regular BEB-BCB communication links (e.g., CL $611_4$ between BEB $610_1$ and BCB $620_2$)). In one such embodiment, the MSTP instances and BVLAN ranges are defined in the BMV and control blocking of the corresponding data B-SAPs.

The ELAN BVPLS entity $618_1$ maps through B-AC1 $810_1$ to Ethernet tunnel endpoint object ET1 820, which in turn maps to each of the three CLs $611_1$ between BEB $610_1$ and BCB $620_1$. The data BVPLS 100 (denoted as BV100) is an example of a multipoint tunnel used to carry ELAN traffic over PBBN 600. In one embodiment, an MSTP instance is used to control BV100), such that a decision to block it on Ethernet tunnel endpoint object ET1 820 (and, implicitly, to allow it on CL $611_4$ between BEB $610_1$ and BCB $620_2$) due to STP exchanges and/or computations may be reflected by the transition of B-AC1 $810_1$ to a forwarding state (just as for any B-AC mapped to a regular BEB-BCB link).

Although primarily depicted and described herein with respect to using specific types, numbers, and arrangements of Ethernet tunnels, Ethernet paths of Ethernet tunnels, Ethernet tunnel endpoint objects, and the like, it will be appreciated that other suitable types, numbers, and/or arrangements of Ethernet tunnels, Ethernet paths of Ethernet tunnels, Ethernet tunnel endpoint objects, and the like may be used.

Figure 9:
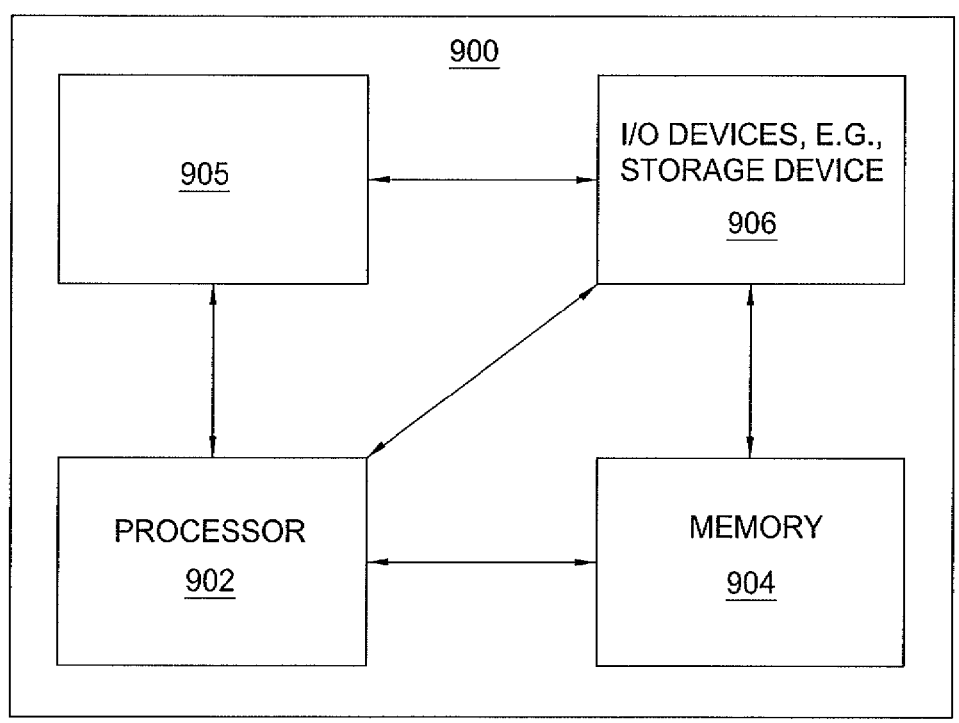
FIG. 9 depicts a high-level block diagram of a computer suitable for use in performing the functions described herein.

FIG. 9 depicts a high-level block diagram of a computer suitable for use in performing functions described herein.

As depicted in FIG. 9, computer 900 includes a processor element 902 (e.g., a central processing unit (CPU) and/or other suitable processor(s)), a memory 904 (e.g., random access memory (RAM), read only memory (ROM), and the like), a cooperating module/process 905, and various input/output devices 906 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or hardware, e.g., using a general purpose computer, one or more application specific integrated circuits (ASIC), and/or any other hardware equivalents. In one embodiment, the cooperating process 905 can be loaded into memory 904 and executed by processor 902 to implement the functions as discussed herein. Thus, cooperating process 905 (including associated data structures) can be stored on a computer readable storage medium, e.g., RAM memory, magnetic or optical drive or diskette, and the like.

It will be appreciated that computer 900 depicted in FIG. 9 provides a general architecture and functionality suitable for implementing functional elements described herein and/or portions of functional elements described herein. For example, the computer 900 provides a general architecture and functionality suitable for implementing one or more of ESs 110, MS 130, BEBs 610, BCBs 620, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An Ethernet switch, comprising:
a processor and a memory communicatively connected to the processor, the processor configured to:
receive, at the Ethernet switch, traffic intended for a second Ethernet switch;
propagate a first portion of the traffic from the Ethernet switch toward the second Ethernet switch based on a first type of Ethernet tunnel endpoint object associated with a plurality of links between the Ethernet switch and the second Ethernet switch, wherein the first type of Ethernet tunnel endpoint object is configured to use a load sharing mode for distributing the first portion of the traffic across the plurality of links between the Ethernet switch and the second Ethernet switch; and
propagate a second portion of the traffic from the Ethernet switch toward the second Ethernet switch based on a second type of Ethernet tunnel endpoint object associated with at least one of the plurality of links between the Ethernet switch and the second Ethernet switch, wherein the second type of Ethernet tunnel endpoint object is configured to use a protection mode.

2. The Ethernet switch of claim 1, wherein the load sharing mode comprises a Link Aggregation Group (LAG) load sharing mode and the protection mode comprises a G.8031 protection mode.

3. The Ethernet switch of claim 1, wherein the load sharing mode comprises a Link Aggregation Group (LAG) load sharing mode.

4. The Ethernet switch of claim 1, wherein the protection mode is a G.8031 protection mode.

5. The Ethernet switch of claim 1, wherein the first portion of the traffic is associated with a first set of Virtual Private LAN Services and the second portion of the traffic is associated with a second set of Virtual Private LAN Services.

6. The Ethernet switch of claim 5, wherein the second set of Virtual Private LAN Services is further associated with an Attachment Circuit (AC) for a link to a third Ethernet switch.

7. A method, comprising:
using a processor and a memory for:
receiving, at a first Ethernet switch, traffic intended for a second Ethernet switch;
propagating a first portion of the traffic from the first Ethernet switch toward the second Ethernet switch based on a first type of Ethernet tunnel endpoint object associated with a plurality of links between the first Ethernet switch and the second Ethernet switch, wherein the first type of Ethernet tunnel endpoint object is configured to use a load sharing mode for distributing the first portion of the traffic across the plurality of links between the first Ethernet switch and the second Ethernet switch; and
propagating a second portion of the traffic from the first Ethernet switch toward the second Ethernet switch based on a second type of Ethernet tunnel endpoint object associated with at least one of the plurality of links between the first Ethernet switch and the second Ethernet switch, wherein the second type of Ethernet tunnel endpoint object is configured to use a protection mode.

8. The method of claim 7, wherein the load sharing mode comprises a Link Aggregation Group (LAG) load sharing mode and the protection mode comprises a G.8031 protection mode.

9. The method of claim 7, wherein the load sharing mode comprises a Link Aggregation Group (LAG) load sharing mode.

10. The method of claim 7, wherein the protection mode is a G.8031 protection mode.

11. The method of claim 7, wherein the first portion of the traffic is associated with a first set of Backbone Virtual Private LAN Services and the second portion of the traffic is associated with a second set of Backbone Virtual Private LAN Services.

12. The method of claim 11, wherein the second set of Virtual Private LAN Services is further associated with an Attachment Circuit (AC) for a link to a third Ethernet switch.

13. An Ethernet switch, comprising:
a processor and a memory communicatively connected to the processor, the processor configured to:
receive a first set of traffic at the Ethernet switch from a second Ethernet switch based on a first type of Ethernet tunnel endpoint object associated with a plurality of links between the Ethernet switch and the second Ethernet switch, wherein the first type of Ethernet tunnel endpoint object is configured to use a load sharing mode for receiving the first set of traffic via the plurality of links between the Ethernet switch and the second Ethernet switch; and
receive a second set of traffic at the Ethernet switch from the second Ethernet switch based on a second type of Ethernet tunnel endpoint object associated with at least one of the plurality of links between the Ethernet switch and the second Ethernet switch, wherein the second type of Ethernet tunnel endpoint object is configured to use a protection mode.

14. The Ethernet switch of claim 13, wherein the load sharing mode comprises a Link Aggregation Group (LAG) load sharing mode and the protection mode comprises a G.8031 protection mode.

15. The Ethernet switch of claim 13, wherein the load sharing mode comprises a Link Aggregation Group (LAG) load sharing mode.

16. The Ethernet switch of claim 13, wherein the protection mode is a G.8031 protection mode.

17. A method, comprising:
   using a processor and a memory for:
      receiving a first set of traffic at a first Ethernet switch from a second Ethernet switch based on a first type of Ethernet tunnel endpoint object associated with a plurality of links between the first Ethernet switch and the second Ethernet switch, wherein the first type of Ethernet tunnel endpoint object is configured to use a load sharing mode for receiving the first set of traffic via the plurality of links between the first Ethernet switch and the second Ethernet switch; and
      receiving a second set of traffic at the first Ethernet switch from the second Ethernet switch based on a second type of Ethernet tunnel endpoint object associated with at least one of the plurality of links between the first Ethernet switch and the second Ethernet switch, wherein the second type of Ethernet tunnel endpoint object is configured to use a protection mode.

18. The method of claim 17, wherein the load sharing mode comprises a Link Aggregation Group (LAG) load sharing mode and the protection mode comprises a G.8031 protection mode.

19. The method of claim 17, wherein the load sharing mode comprises a Link Aggregation Group (LAG) load sharing mode.

20. The method of claim 17, wherein the protection mode is a G.8031 protection mode.

* * * * *